(12) United States Patent
Ho

(10) Patent No.: US 8,396,696 B1
(45) Date of Patent: Mar. 12, 2013

(54) USING MULTIPLE PROCESSORS TO SIMULATE ELECTRONIC CIRCUITS

(75) Inventor: William Wai Yan Ho, Cupertino, CA (US)

(73) Assignee: Worldwide Pro Ltd., Hong Kong (CN)

( * ) Notice: Subject to any disclaimer, the term of this patent is extended or adjusted under 35 U.S.C. 154(b) by 265 days.

(21) Appl. No.: 12/915,362

(22) Filed: Oct. 29, 2010

Related U.S. Application Data

(63) Continuation of application No. 11/421,206, filed on May 31, 2006, now Pat. No. 7,827,016.

(51) Int. Cl.
*G06F 17/50* (2006.01)

(52) U.S. Cl. .................. 703/2; 703/14; 703/24; 716/1; 716/4; 716/100

(58) Field of Classification Search ............... 703/2, 14, 703/24; 716/1, 4, 100
See application file for complete search history.

(56) References Cited

U.S. PATENT DOCUMENTS

| | | | |
|---|---|---|---|
| 4,775,950 A | 10/1988 | Terada et al. | |
| 5,379,231 A | 1/1995 | Pillage et al. | |
| 5,446,676 A | 8/1995 | Huang et al. | |
| 7,353,157 B2 | 4/2008 | Wasynczuk et al. | |
| 7,630,370 B2 * | 12/2009 | Deshpande et al. | 370/390 |
| 7,827,016 B1 * | 11/2010 | Ho | 703/13 |
| 8,112,264 B1 * | 2/2012 | Ho | 703/14 |
| 2004/0215430 A1 * | 10/2004 | Huddleston et al. | 703/2 |
| 2007/0171733 A1 | 7/2007 | Wood | |
| 2007/0198971 A1 * | 8/2007 | Dasu et al. | 717/140 |
| 2008/0072190 A1 | 3/2008 | Jain et al. | |
| 2008/0205394 A1 * | 8/2008 | Deshpande et al. | 370/390 |

OTHER PUBLICATIONS

Klinger, V., "DiPaCS: A New Concept for Parallel Circuit Simulation", Simulation Symposium, 1995, Proceedings of the 28th Annual, Apr. 9-13, 1995, pp. 32-41.

* cited by examiner

*Primary Examiner* — Thai Phan
(74) *Attorney, Agent, or Firm* — Aka Chan LLP

(57) ABSTRACT

A circuit is simulated by using distributed computing to obtain a real solution. The circuit may be an entire integrated circuit, portion of an integrated circuit, or a circuit block. A circuit simulation technique of the invention generates a system graph, finds a tree, and partitions the tree into two or more subtrees. The technique identifies global links and local links in the graph. Each subtree may be solved individually using distributed, parallel computing. Using the results for the subtrees, the technique obtains a real solution, branch voltages and currents, for the circuit.

20 Claims, 8 Drawing Sheets

USING MULTIPLE PROCESSORS TO SIMULATE ELECTRONIC CIRCUITS

CROSS-REFERENCE TO RELATED APPLICATIONS

This patent application is a continuation of U.S. patent application Ser. No. 11/421,206, filed May 31, 2006, issued as U.S. Pat. No. 7,827,016 on Nov. 2, 2010, which is incorporated by reference along with all other references cited in this application.

BACKGROUND OF THE INVENTION

The present invention relates to the field of electronic design automation for electronic circuits and, more specifically, to systems and techniques to perform circuit simulation using distributed computing to obtain a real or exact solution.

The age of information and electronic commerce has been made possible by the development of electronic circuits and their miniaturization through integrated circuit technology. Integrated circuits are sometimes referred to as "chips." Some types of integrated circuits include digital signal processors (DSPs), amplifiers, dynamic random access memories (DRAMs), static random access memories (SRAMs), erasable programmable read only memories (EPROMs), electrically erasable programmable read only memories (EEPROMs), Flash memories, microprocessors, application specific integrated circuits (ASICs), and programmable logic.

Integrated circuits have been widely adopted and are used in many products in the areas of computers and other programmed machines, consumer electronics, telecommunications and networking equipment, wireless network and communications, industrial automation, and medical instruments, just to name a few. Electronic circuits and integrated circuits are the foundation of the Internet and other on-line technologies including the World Wide Web (WWW).

There is a continuing demand for electronic products that are easier to use, more accessible to greater numbers of users, provide more features, and generally address the needs of consumers and customers. Integrated circuit technology continues to advance rapidly. With new advances in technology, more of these needs are addressed. Furthermore, new advances may also bring about fundamental changes in technology that profoundly impact and greatly enhance the products of the future.

To meet the challenges of building more complex and higher performance integrated circuits, software tools are used. These tools are in an area commonly referred to as computer aided design (CAD), computer aided engineering (CAE), or electronic design automation (EDA). There is a constant need to improve these electronic automatic tools in order to address the desire for higher integration and greater complexity, and better performance in integrated circuits.

Large modern day integrated circuits have millions of devices including gates and transistors and are very complex. As process technology improves, more and more devices may be fabricated on a single integrated circuit, so integrated circuits will continue to become even more complex with time. In the past, many parasitic effects may not have been considered because they were less significant or insignificant compared to other factors.

As lithography and miniaturization techniques advance, on-chip devices and line widths become smaller, frequencies increase. As a consequence, many more impedances such as parasitic resistances, inductances, and capacitances and parasitic effects need to be considered. If these parasitics and effects are not taken into account, poor simulation results will result, and possible the electronic circuits will not work as expected after the circuit is fabricated. As more and more parasitic and other effects are accounted for, the circuit networks to be simulated become much more complex. As complexity increases, simulating the network takes significantly more computing resources and computation time.

More specifically, in nanometer, gigahertz, low power VLSI design, power and signal integrity has become critical. To accurately analyze chip performance, it is desirable to consider the impact of power fluctuation, and the capacitive, inductive, or even substrate coupling noise with devices, or any combination of these. This analysis entails considering a very large amount of elements, which results in a very large system matrix for circuit simulation. This is a lack of a circuit simulation algorithm that can simultaneously resolve a large number of linear or linear with nonlinear devices while maintaining both efficiently and accuracy.

Therefore, there is a need for a higher performance system of simulating circuits, especially a system and method for simulating circuitry using a distributed computing environment and obtaining real or exact results.

BRIEF SUMMARY OF THE INVENTION

A circuit is simulated using distributed computing to obtain a real solution. The circuit may be an entire integrated circuit, portion of an integrated circuit, or a circuit block. A circuit simulation technique of the invention generates a system graph, finds a tree, and partitions the tree into two or more subtrees. The technique identifies global links and local links in the graph. Each subtree may be solved individually using distributed, parallel computing. Using the results for the subtrees, the technique obtains a real solution, branch voltages and currents, for the circuit.

By using distributed computing, more calculations may be performed in parallel, which allows circuit simulation results to be determined more quickly. The invention divides or tears a circuit simulation block into smaller subblocks that can be calculated by distributed computer, and then these results may be combined to obtain real results for the entire circuit. They may be multiple levels of subblocks, and each level would be handled in a similar fashion.

In an implementation, the invention is a system including a network, a number of computing devices, connected to the network, and a circuit simulation block. The circuit simulation block includes a system or network tearing block to divide a given circuit network graph into at least a first subtree and a second subtree. The circuit simulation block includes a subblock solver block to send the first subtree through the network to a first computing device of the plurality of computing devices for calculation and the second subtree through the network to a second computing device of the plurality of computing devices for calculation.

In another implementation, the invention is a method including (a) providing a system graph of an electronic circuit; (b) identifying each branch of the system graph as at least one of a tree branch or a link, where the tree branches form a tree of the system graph; (c) partitioning the tree into at least a first subtree and a second subtree; (d) identifying links of the system graph as at least one of a global link or a local link, where a global link forms a path from a branch of the first subtree to a branch of the second subtree; (e) using a first processing unit, calculating a solution to the first subtree while ignoring global links; and (f) using a second processing unit, calculating a solution to the second subtree while ignoring global links.

In another implementation, the invention is a system embodied using a computer-readable medium including: a first code component to provide a system graph of an electronic circuit; a second code component to identify each branch of the system graph as at least one of a tree branch or a link, where the tree branches form a tree of the system graph; a third code component to partition the tree into at least a first subtree and a second subtree; a fourth code component to identify links of the system graph as at least one of a global link or a local link, where a global link forms a path from a branch of the first subtree to a branch of the second subtree; and a fifth code component to direct the first subtree to a first processing unit for calculation and to direct the second subtree to a second processing unit for calculation.

In another implementation, the invention is a method including providing a system graph of an electronic circuit. The method identifies each branch of the system graph as at least one of a tree branch or a link, where the tree branches form a tree of the system graph. The tree is partitioned into at least a first subtree and a second subtree. Links of the system graph are identified as at least one of a global link or a local link, where a global link forms a path from a branch of the first subtree to a branch of the second subtree.

A tree branch forms no loops in the system graph. A link forms a loop in the system graph. A local link forms a loop in a subtree. A global link forms a loop between two subtrees. A loop has a voltage drop of zero.

The invention may include calculating a solution to the first subtree including local links while ignoring global links, and calculating a solution to the second subtree including local links while ignoring global links. A solution to the first subtree may include finding voltage and current for each branch and local link of the first subtree. A solution to the second subtree may include finding voltage and current for each branch and local link of the second subtree.

Partitioning the tree into at least a first subtree and a second subtree may include: Forming the first subtree by repeatedly adding branches of the tree to the first subtree when a number of branches in the first subtree is less than a predefined count and there are branches in the tree which have not yet been assigned to a subtree. Forming the second subtree by repeatedly adding branches of the tree, not already assigned to the first subtree, to the second subtree when a number of branches in the first subtree is less than the predefined count and there are branches in the tree which have not yet been assigned to a subtree. After partitioning the tree into at least a first subtree and a second subtree, each subtree has a number of branches less than or equal to a predefined count.

In another implementation, the invention is a computer-implemented method including (a) providing a circuit to be evaluated; (b) forming a network tree of the circuit; (c) providing a count value; (d) assigning branches of the network tree to an subtree n until the subtree n has a number of branches equal to the count value; (e) while the network tree has branches unassigned to any subtree, repeatedly assigning the unassigned branches of the network tree to a subtree n+1 until the subtree n+1 has a number of branches equal to the count value; and (f) identifying links that form a loop with branches of two or more subtrees as global links. In an embodiment, the value n may be any integer value.

The computer-implemented method may include summing branch voltages of a loop formed by a global link with at least one branches of a first subtree and at least one branch of a second subtree results in a sum of zero. In other words, the voltage for a loop formed by global link with two or more subtrees will be zero.

For the computer-implemented method, when the network tree has p unassigned branches, where p is less than the count value, a last subtree q may be formed having p branches. For the network tree, there will be q subtrees. Each of the subtrees will have a number of branches equal to the count value, except for subtree q (which is the last subtree is extracted according to this implementation) which will have p branches.

The computer-implemented method may further include determining a solution for each of the q subtrees, independently of each other and without considering any global links associated with any of the q subtrees. Therefore, each of the q subtrees may be simulated independently of each other, without regard to order. This will allow finding solutions for the subtrees in a distributed computing environment without scheduling concerns.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
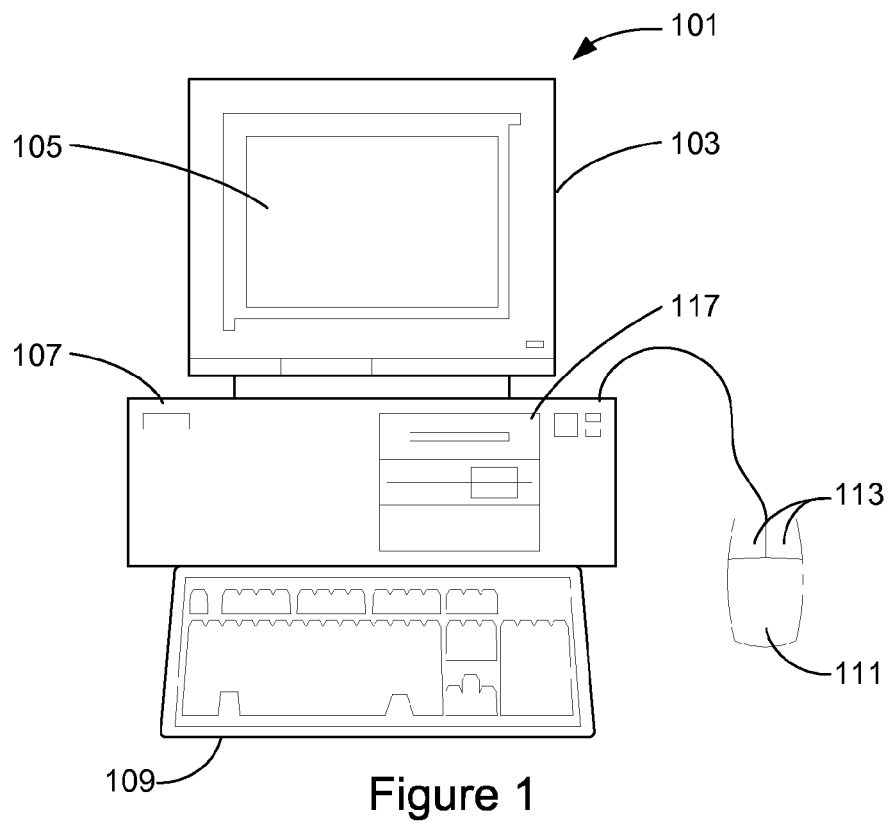
FIG. 1 shows a system of the present invention for performing integrated circuit simulation.

FIG. 1 shows an electronic design automation (EDA) system of the present invention for designing an electronic circuit or integrated circuit, including circuit simulation of the entire integrated circuit, portions of the integrated circuit, or circuit blocks. In an embodiment, the invention is software that executes on a computer workstation system, such as shown in FIG. 1. FIG. 1 shows a computer system 1 that includes a monitor 3, screen 5, cabinet 7, keyboard 9, and mouse 11. In some implementations, however, electronic design automation systems are operated headless, which means these systems will not a mouse, keyboard, display, and so forth. Mouse 11 may have one or more buttons such as mouse buttons 13. Cabinet 7 houses familiar computer components, some of which are not shown, such as a processor, memory, mass storage devices 17, and the like.

Mass storage devices 17 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other non-volatile solid-state storage (e.g., USB flash drive), battery-backed-up volatile memory, tape storage, reader, and other similar media, and combinations of these. A binary machine-executable version of the software of the present invention may be stored or reside on mass storage devices 17. Furthermore, the source code of the software of the present invention may also be stored or reside on mass storage devices 17 (e.g., magnetic disk, tape, CD-ROM, or DVD).

A computer-implemented version of the invention may be embodied using, or reside on, computer readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 17. The source code of the software of the present invention may also be stored or reside on mass storage device 17 (e.g., hard disk, magnetic disk, tape, or CD-ROM). As a further example, code of the invention may be transmitted via wires, radio waves, or through a network such as the Internet.

Figure 2:
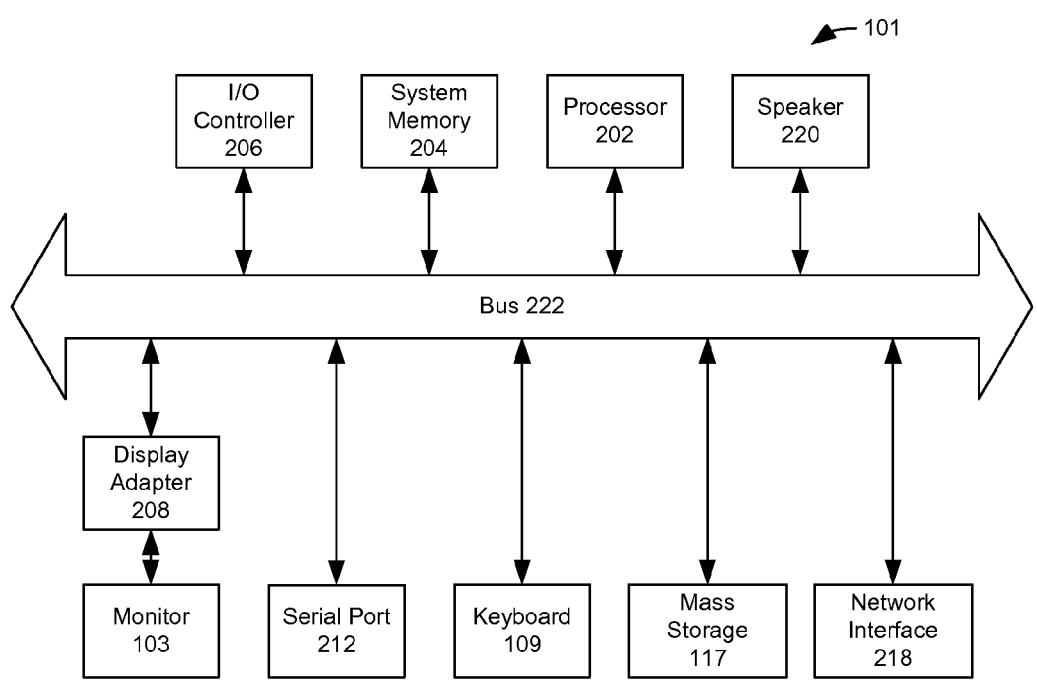
FIG. 2 shows a simplified system block diagram of a computer system used to execute software of the invention.

FIG. 2 shows a system block diagram of computer system 1 used to execute software of the present invention. As in FIG. 1, computer system 1 includes monitor 3, keyboard 9, and mass storage devices 17. Computer system 1 further includes subsystems such as central processor 202, system memory 204, input/output (I/O) controller 206, display adapter 208, serial or universal serial bus (USB) port 212, network interface 218, and speaker 220. The invention may also be used with computer systems with additional or fewer subsystems. For example, a computer system could include more than one processor 202 (i.e., a multiprocessor system) or the system may include a cache memory.

The processor may be a dual core or multicore processor, where there are multiple processor cores on a single integrated circuit. The system may also be part of a distributed computing environment. In a distributed computing environment, individual computing systems are connected to a network and are available to lend computing resources to another system in the network as needed. The network may be an internal ethernet network, Internet, or other network. Some examples of distributed computer systems for solving problems over the Internet include Folding@home, SETI@home, and the Great Internet Mersenne Prime Search (GIMPS).

Arrows such as 222 represent the system bus architecture of computer system 1. However, these arrows are illustrative of any interconnection scheme serving to link the subsystems. For example, speaker 220 could be connected to the other subsystems through a port or have an internal connection to central processor 202. Computer system 1 shown in FIG. 1 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, MatLab (from MathWorks, Inc.), SAS, SPSS, Java, JavaScript, and AJAX. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems).

An operating system for the system may be one of the Microsoft Windows® family of operating systems (e.g., Windows 95, 98, Me, Windows NT, Windows 2000, Windows XP, Windows XP x64 Edition, Windows Vista, Windows CE, Windows Mobile), Linux, HP-UX, UNIX, Sun OS, Solaris, Mac OS X, Alpha OS, AIX, IRIX32, or IRIX64, or combinations of these. Other operating systems may be used. Each computer in a distributed computing environment may use a different operating system.

Furthermore, the computer may be connected to a network and may interface to other computers using this network. For example, each computer in the network may perform part of the task of the many series of circuit simulation steps in parallel. Furthermore, the network may be an intranet, internet, or the Internet, among others. The network may be a wired network (e.g., using copper), telephone network, packet network, an optical network (e.g., using optical fiber), or a wireless network, or any combination thereof. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

A specific type of electronic design automation tool is a circuit simulation program or system. A circuit simulation program performs analysis of circuits containing resistors, capacitors, inductors, mutual inductors, independent voltage and current sources, dependent sources, transmission lines, and semiconductor devices including diodes, bipolar junction transistors (BJTs), junction field effect transistors (JFETs), and metal over semiconductor field effect transistors (MOSFETs). A circuit simulator may perform nonlinear DC, nonlinear transient, linear AC, and other analyses.

One circuit simulation program is SPICE, originating from the University of California, Berkeley. SPICE stands for "Simulation Program Integrated Circuits Especially!" Despite the success of SPICE and other circuit simulation programs, existing circuit simulation programs use methodology and computational techniques not suitable for use in distributed computing environment and determining real or exact solutions.

Figure 3:
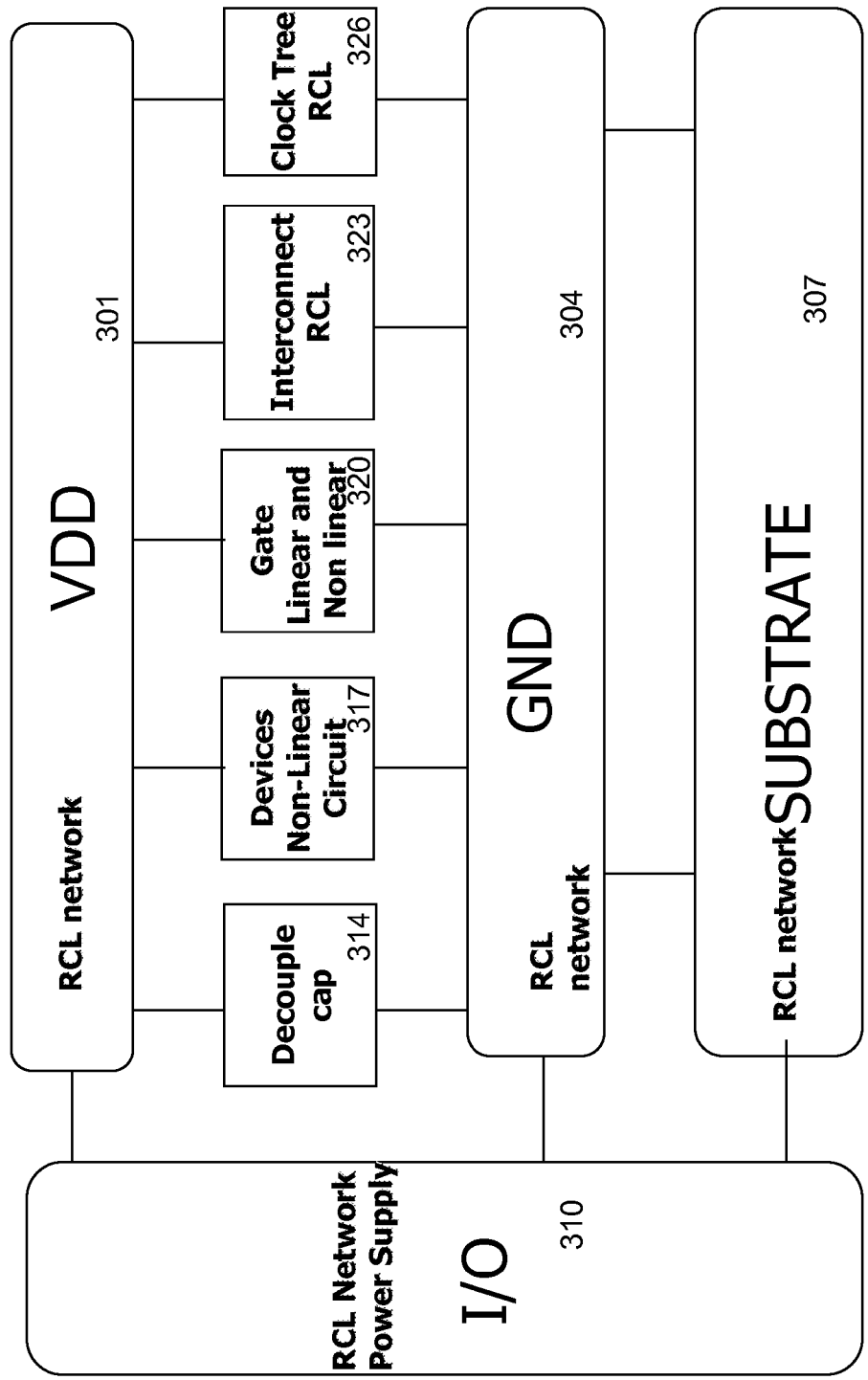
FIG. 3 shows a typical modeling of an integrated circuit for circuit simulation.

FIG. 3 shows a typical modeling of a circuit or integrated circuit for circuit simulation. The model uses resistance, capacitance, inductance, and nonlinear devices. The model has two supply networks, VDD 301 and ground (GND) 304, and a substrate network 307. VDD, GND, and the substrate may be more specifically modeled using a resistance-capacitance-inductance (RCL) network. A power supply or other input-output (I/O) 310 are connected to the VDD, GND, and substrate. The power supply may be modeled using a resistance-capacitance-inductance (RCL) network. There may be more supplies then VDD and ground, and these would be modeled similarly to VDD, GND, and substrate.

Between VDD and GND, there may be various components or devices including decoupling capacitors 314, devices nonlinear circuits, gates linear and nonlinear, interconnect RCL, and clock tree RCL. Examples of devices nonlinear circuits include transistors, BJT and MOS, and diodes. Examples of gates linear and nonlinear include NAND, NOR, OR, AND, logic blocks, intellectual property (IP) blocks, and others.

Any one or more components or devices may be connected to VDD and GND, and in any combination. For example, one or more transistors may be connected between the supplies. The transistors may form an amplifier, NAND gate, or other circuit that is to be simulated according to this model.

In circuit simulation, a circuit or component is represented using an RCL network and sources. For example, a bipolar junction transistor (BJT) may be represented using a hybrid-pi model, which has resistances, capacitances, and a dependent current source. A MOSFET transistor may be modeled using, for example, a BSIM or other model. The model representation of a device or other component may be referred to as its equivalent circuit. It can be appreciated as an electronic circuit has more and more transistors, gates, and other components, the equivalent model of the electronic circuit becomes a much more complicated RCL network with sources. As a circuit gets larger, the simulation of the circuit becomes more complicated, taking more time, memory, and CPU resources in determining a solution.

Figure 4:
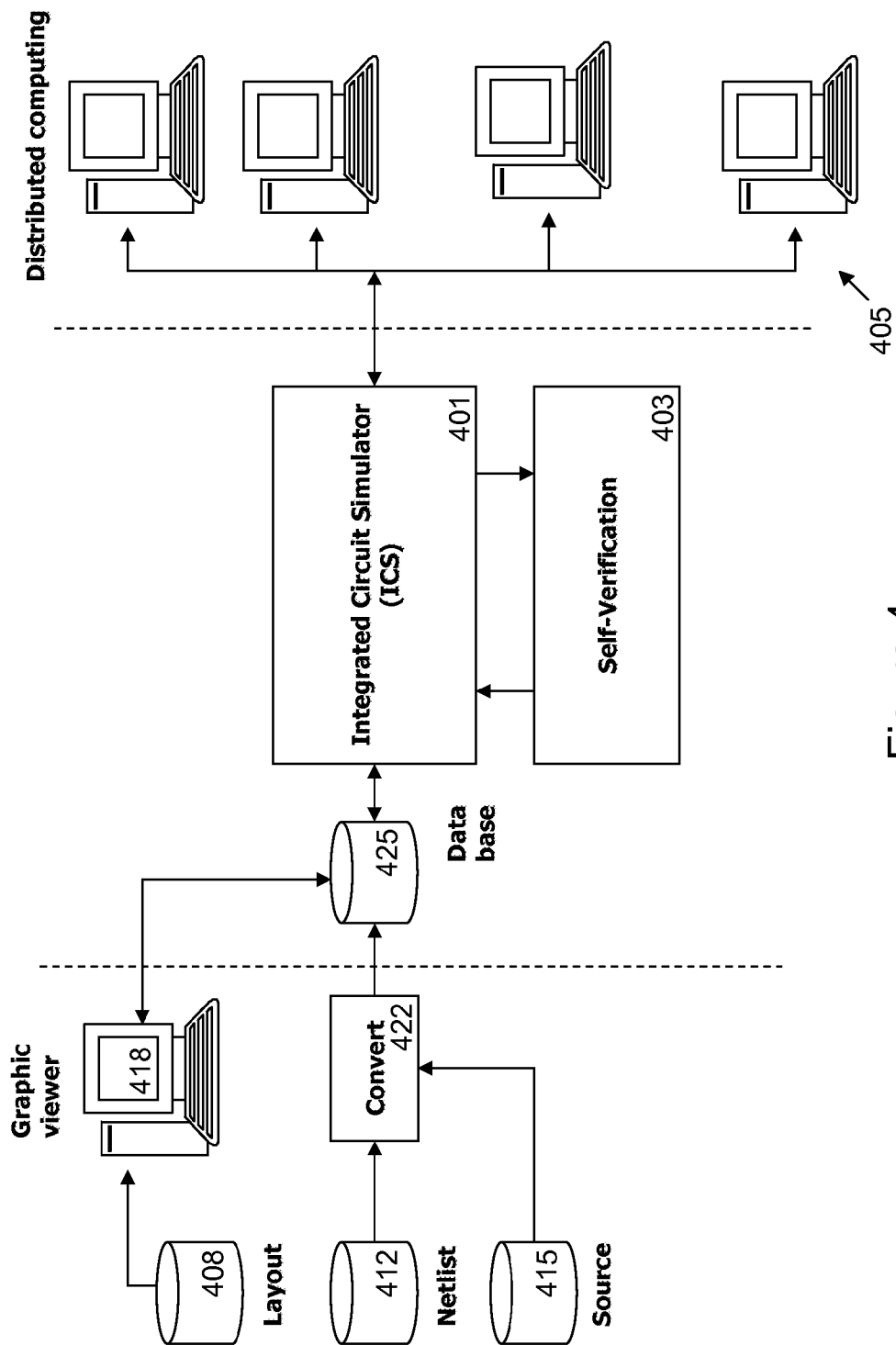
FIG. 4 shows a system flow including an integrated circuit simulator to perform circuit simulating using a distributed computing environment to obtain real solutions.

FIG. 4 shows a system diagram and flow including an integrated circuit simulator (ICS) 401 to perform circuit simulation using distributed computing. In an embodiment, the invention provides simulation of a circuit, portion or sections of an integrated circuit, or entire integrated circuit. The simulation may use a model as described in FIG. 3 and the accompany text. The integrated circuit simulator may also be called a current-resistance (IR) drop simulator because it can perform IR analysis for a given circuit. The simulator can determine voltage drop and current for each branch of the circuit. The simulator may work in a static or DC mode or a dynamic or AC mode. By iteratively calculating IR drops at different time steps, the simulator can do dynamic simulation at each time step.

In an embodiment, the integrated circuit simulator (ICS) may be used with a parallel processing supercomputer, where various tasks are distributed among the many processors. As example, a supercomputer may have 8000 or more processors and can perform 12 trillion calculations per second. Supercomputers are relatively expensive and less expensive parallel processing architectures are available.

In an embodiment, the integrated circuit simulator distributes a circuit simulation task among a number of computers in a distributed computing environment 405 for calculation. More specifically, portions of the circuit simulation task are divided among the different computer devices, each of which will solve a portion of the entire circuit simulation computation. In the figure, four computing devices are shown in the distributed computing network, but it will be understood there may be any number of computers or computing devices in the distributed computing network, such as ten, twenty, thirty, forty, fifty, and even hundreds or thousands.

Each of the computing devices may have one or more processors or CPUs, or one or more multicore processors. Some examples of microprocessors include the Intel Pentium, Celeron, PCA, Itanium, and Xeon families of processors, AMD Athlon, Sepron, and Opteron families or processors, UltraSPARC processors, IBM PowerPC processors, MIPS processors, ARM processors, and SH processors.

The network that connects the computing devices and the integrated circuit simulator may be a data communication network such as a telephone line, ethernet (such as 10 megabit, 100 megabit, or 1 gigabit), fiber optics, wireless (such as Wi-Fi), satellite, or the Internet. Data may be passed between different computers and the integrated circuit simulator in a binary serially or in parallel.

A specific technique of distributed computing is an environment where a computational task can harness idle CPU cycles and storage space of tens, hundreds, or thousands of networked systems to work together on a particularly processing-intensive problem. Another type of distributed computing is grid computing where the CPU cycles and storage of millions of systems across a worldwide network function as a flexible, readily accessible pool that can be harnessed. The advantage of a distributed computing architecture is its ability to provide supercomputing level processing power or better for a fraction of the cost.

In a specific embodiment, each of the distributed computers (may also be known as a processing client) will have an agent running to detect when the system is idle and if so, notifies a management server of the distributed network that the system is available for processing. Then the processing client requests an application package. The client then receives an application package from the server and runs the software when it has spare CPU cycles, and sends the results back to the server. The application may run in the background without impacting normal use of the computer. If the user of the client system needs to run his own applications at any time, control is immediately returned, and processing of the distributed application package ends or slows. This generally occurs essentially instantaneous.

A distributed computing management server has several roles. Such roles may be incorporated into the integrated circuit simulator, or there may be a separate server that receives instructions from the integrated circuit simulator. The distributed computing management server takes distributed computing requests and divides their large processing tasks into smaller tasks that can run on individual computing systems. They send application packages and some client management software to the idle client machines that request them. They monitor the status of the jobs being run by the clients. After the client machines run those packages, they assemble the results sent back by the client and structure them for presentation, usually with the help of a database.

The above-described distributed computing system is merely an example of one approach to distributed computing. There are many other approaches to distributed computing and the present invention may be used with any the approaches to distributed computing. The invention will take advantage of the parallel processing capability of a distributed computing system to speed up circuit simulation.

In the system, a circuit is described using one or more of a layout 408, netlist 412 (or schematic capture), and source 415. These may be in a database format and describe circuitry for the integrated circuit simulator. The layout may be provided in a format such as GDSII. GDSII may be viewed by the user via a graphic viewer 418 such as a computer display. Netlist 412 describes components, gates, devices, and connectivity of the circuit design. Source 415 describes the sources of the circuit design including voltage, current, dependent voltage, and dependent current sources.

The circuit simulator of the invention may be used before or after layout. After layout, parasitic impedances, resistances and capacitances, may be determined from the layout geometries. These parasitic values may be back-annotated into the netlist, which help improve the accuracy of the results of a simulation of the circuitry.

The netlist and source may be converted 422 into a database format 425. Database 425 is in a format used by the integrated circuit simulator. Conversion 422 may be performed by the same computer running the integrated circuit simulator, or may be run on a different computer.

The user may view and access database 425. The user may specify part or all the circuitry will be simulated, a task further handled by the integrated circuit simulator. For example, a user may want to simulate only an output buffer or a number of output buffers.

The integrated circuit simulator controls the simulation job, and will distribute jobs to two or more computers in a network. After the computation is complete, the integrated circuit simulator receives the results from each machine in the distributed network and will assemble the results back together again. The results may be placed into database 425, where the user may view them. In an embodiment of the invention, the database may be output back into a netlist format with current values and voltages values for each impedance.

The system may optionally include a self-verification tool 403. The self-verification tool may be included in some embodiments, while it is omitted in other embodiments of the invention. The self-verification takes the simulation results of verifies the results are correct. U.S. patent application Ser. No. 11/279,391, filed Apr. 11, 2006, issued as U.S. Pat. No. 7,461,360 on Dec. 2, 2008, discusses simulation verification and is incorporated by reference along with any other references cited in this application. A technique of simulation verification involves determining whether the simulation results obtained satisfy Kirchhoff's current law (KCL), Kirchhoff's voltage law (KVL), and the power conservation law. The verification results are provided to the integrated circuit simulator.

Some computational tasks, such as searching for prime numbers, are suitable for distributed computing because the tasks can easily be subdivided. However, it is a nontrivial task to perform circuit simulation using a distributed computing environment because typical circuits form very complex networks. In a typical circuit simulation approach, the circuit network is described using a modified nodal equation matrix. To solve the circuit, a matrix inversion of the modified nodal equation matrix is needed. However, it is difficult to invert a matrix using distributed computing. This is especially the case for the relatively large matrix needed to describe a typical circuit.

It is a nontrivial task dividing up the matrix operations and calculations for computation by separate computers, obtaining the results, and then putting back the individual results back together again. It may be more difficult computationally and take longer to solve than simply solving the matrix itself on a single machine. This is a reason why there have been no circuit simulators that use distributed computing that find a real or exact solution. A real solution has exact values as compared to an estimated solution arrived by an iterative or approximation technique.

It is desirable to use distributed computing to speed up the circuit simulation. By speeding up circuit simulation, this allows more precise estimation of the circuitry, instead of using approximations to reduce the matrix size, and allows simulations of much more complex circuits and networks. Using a system and approach such as in FIG. 4, the invention uses distributed computing and parallel processing (as available) to perform and speed up circuit simulation and obtain a real solution, not an estimated or approximate solution.

Although the invention is described as being particularly suited for a distributed computing environment, the invention may also be used in a nondistributed computing environment. In some embodiments, the technique of the invention can be utilized on a single computer (e.g., a desktop or notebook computer) having single processor or multiprocessor. For example, instead of having multiple computers as in FIG. 4, there would be one computer.

The processor of the computer may have any number of cores such one, two, three, four, or more. Even when implemented using a single computer environment, the technique of the invention will provide great advantages over previous simulation techniques, especially in the performance. Real-solution simulation results will be obtained in significantly less time than using prior art techniques.

A representative flow for designing an integrated circuit is outlined in steps 1 to 8 below.

Integrated Circuit Design Flow
 1. Provide Circuit Specification
 2. Create Circuit Design
 3. Generate Netlist
 4. Simulate Performance and Verify Functionality of Circuit Design
 5. Generate Layout
 6. Physical Verification and Design Checking
 7. Create Masks
 8. Fabricate Integrated Circuit Although the steps above are listed in a specific order, the steps may take place in any order, as desired and depending on the specific application. These are general steps that may be applied to designing an integrated circuit including custom, a gate array, standard cell, field programmable logic, microprocessor, digital signal processor, microcontroller, system-on-a-chip (SOC), memory, ASIC, mixed signal, analog, radio frequency (RF) or wireless, and others. There may be additional or other steps, which may replace one or more above steps. Certain steps may be repeated. For example, after generating a layout for a circuit design, the step of simulating performance and verifying functionality may be performed again. This time, the parasitics and RC considerations from the layout can be back-annotated into the netlist or circuit design, and the design simulated again. The results of this simulation will presumably be more accurate because more precise information is provided.

In step 1 of the flow, a circuit specification is provided. This is a specification or description of what the integrated circuit or circuit will do, and what the performance will be. For example, the integrated circuit may be a memory integrated circuit with particular address input pins and input-output (I/O) pins. Integrated circuit performance may be quantified terms in AC and DC performance. For example, AC performance refers to propagation delays, maximum clock frequency, clock-to-output delay, hold time, and other similar parameters. DC performance refers to maximum supply current, maximum and minimum supply voltage, output current drive, and other similar parameters.

In step 2, an engineer creates a circuit design that presumably will meet the circuit specification. This circuit design may include transistors, resistors, capacitors, and other electronic components. The engineer uses these electronic components and cells made from such devices or other cells of the design as building blocks, interconnecting them to achieve the desired functionality and performance. The engineer may make a custom design using electronic component building blocks or use a gate array, where the building blocks are sets of cells set by the gate array manufacturer. The design may be input using a graphical design tool such as schematic capture program, and any other design tool may be used. The circuit may be described using a high-level design language (HDL). These design tools will create a netlist (step 3) of the circuitry, which is a listing of the devices or cells, or both, and their interconnections.

During the design phase, the engineer simulates the performance and verifies the functionality of the circuitry (step 4). There are transistor and process models to model the components. Some simulation tools include Spice and Hspice, which performs circuit simulation, and Verilog, which performs functional and timing verification. Timing constraints can be derived from simulation or static timing analysis, or from inspection of high-level constraints, or from rules of thumb or electrical rules.

After deciding upon an initial circuit design, the engineer begins layout (step 5) of the circuitry. Layout refers to making the three-dimensional dispositions of the element and interconnections to make an integrated circuit. Making an integrated circuit is a layer by layer process. Some layers of an integrated circuit are diffusion, polysilicon, metal-1, metal-2, contact, via, and others. There may be multiple layers of the same material, but on different layers. For example, diffusion and polysilicon layers are used to make MOS transistors. For example, metal-1 and metal-2 are two different layers, where metal-1 is below the metal-2 layer. These metal layers may be connected together using a via. Metal is typically used for interconnections and supplying power and ground to the devices.

In step 6, after or while the layout is generated, the physical design is verified and checked. For example, some of these operations may include layout-versus-schematic (LVS) checking, electrical rule checking (ERC), design rule checking (DRC), layout simulation (especially for analog circuitry), power analysis, and timing analysis. Physical verification and design checking is often iterative. Based on the design check, a design engineer or user may make changes to the design or layout, or both and the design may be rechecked in order to make sure any areas of concern or design errors have been cleared.

The result of layout is data (e.g., provided in GDSII or other format) that is used to make the masks (step 7). The masks are used to fabricate the integrated circuit (step 8) using a photolithography process. Typically, there are many "copies" of the same integrated circuited fabricated on the same wafer. Each integrated circuit is a "die" on the wafer. Good dies are separated from the bad dies. The good dies are sawed and packaged. Packaging generally includes encapsulating the die in plastic or other material, and connecting pads of the integrated circuit to pins of the package, where the integrated circuit can be interfaced.

In electronic circuits, there are often signal paths whose specific performance limits the overall performance of the whole circuit. For instance, if a certain path is slower to evaluate than all others in the circuit then it will set the maximum speed at which the circuit can operate. Such paths are called critical paths.

While designing an electronic circuit, one of the important steps is to determine the wiring of the signal paths. The delay or other performance characteristics of the signal path is determined both by the components in that path and the wires that join them. If a path proves to be too slow, often designers may change the components so as to increase the signal currents or may make other changes to the circuitry or layout.

Figure 5:
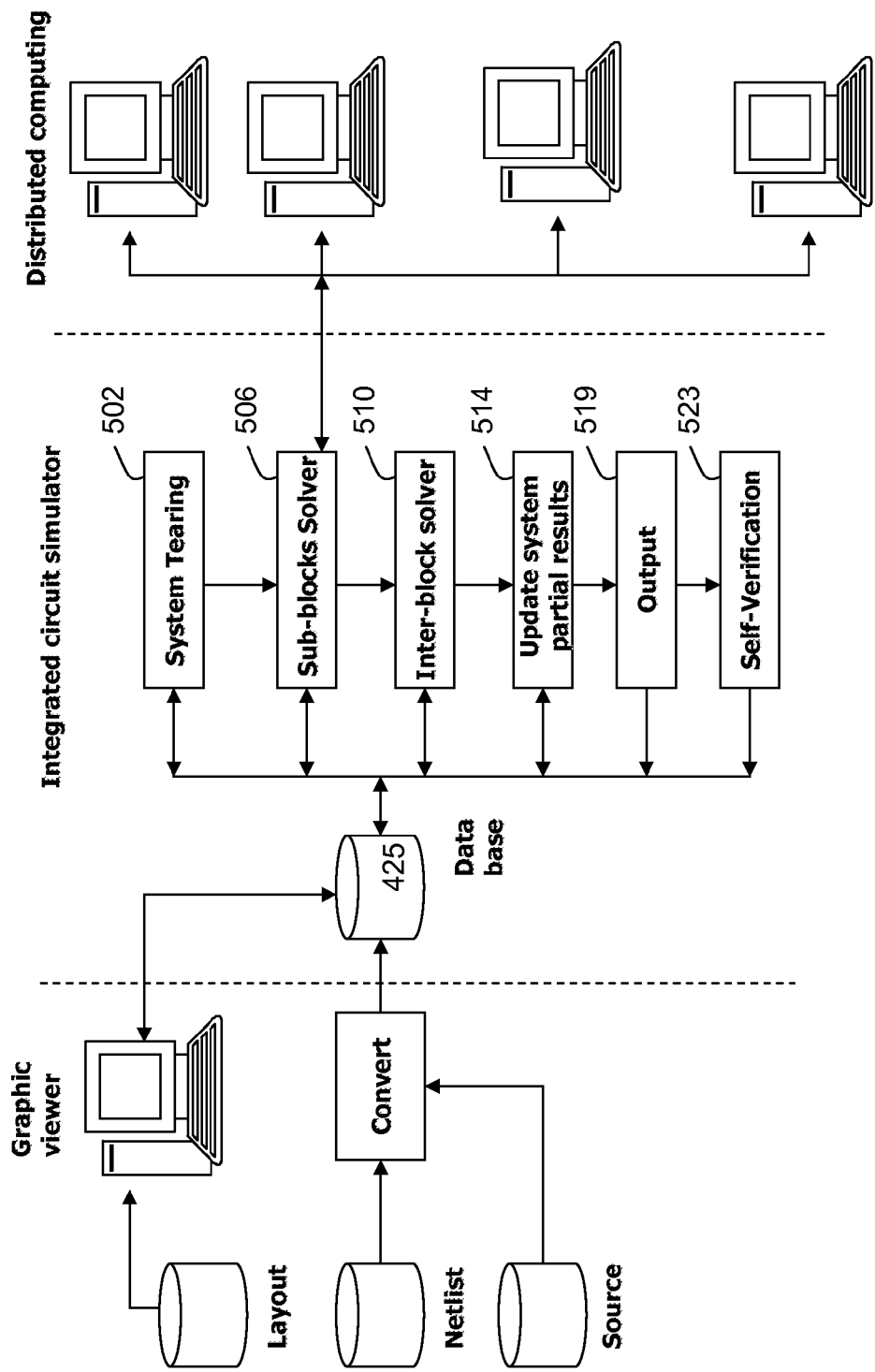
FIG. 5 shows another system flow, providing greater detail of the integrated circuit simulator.

FIG. 5 shows another system flow, providing greater detail of the integrated circuit simulator. This system is similar to the one in FIG. 4, but shows more detail of the integrated circuit simulator (ICS) and its operation. The integrated circuit simulator has a system or network tearing block 502, subblocks solver block 506, interblock solver block 510, update system partial results block 514, output block 519, and self-verification block 523. As discussed above, the self-verification block is optional. Each of these blocks is connected or accessible to the database 425 and to each other.

In a flow of the system, an output of system or network tearing is input to the subblocks solver. An output of the subblocks solver is input to the interblock solver. An output of the interblock solver is input to the update system partial results block. And an output of the update system partial results block is input to the output block. Output of the output block may be input to the self-verification block. Self-verification verifies the accuracy of the simulation results determined by the output block.

System or network tearing 502 does partitioning or decoupling of the circuit network into pieces. Each piece of the circuit may be referred to as a subblock.

Subblocks solver 506 forms a subblock matrix for each subblock, solves the subblock system matrix, and creates its equivalent circuit. The solver solves the equation Ax=b, obtained by inverting the matrix A, LU factoring of the matrix, or another technique. The result is a voltage and current for each branch in the subblock. The results also include the equivalent circuit matrix, which is related to an inversion of A. Each of the subblocks may be solved using a different computer in a distributed computing environment, which speeds up the process because many calculations are done in parallel with other calculations. Each subblock has a partial result.

Compared to a traditional circuit simulation approach, the matrices of the subblocks to be inverted or factored are significantly smaller than a matrix for the entire system. The matrix inversion is speeded up because matrix inversion is an $O(n^3)$ problem. With smaller values of n, the solutions becomes closer to a linear problem or $O(n)$. In other words, the problem will be $O(n^k)$, where k is a constant and much less than 3.

Interblock solver 510 takes the subblock results including each subblock equivalent matrix and assembles these together by generating a system matrix including the equivalents matrixes of each lower lever with the interconnect. The solver solves the interconnect that connect the subblocks together.

In the flow in FIG. 5, there are two levels, a subblock level and an interblock level. In further embodiments of the invention, there may be multiple subblock levels, more than two. A method similar to that described in FIG. 5 and above is repeated for handling the further levels. For example, there may three, four, five, or more subblock and interblock levels.

Update system partial results 514 combines the partial results with the interconnect-level results (obtained using the interblock solver) to find the exact or real results for the entire circuit. Output block 519 outputs the results into database 425.

Self-verification block 523 is an optional block. In some implementations of the invention, self-verification may be available for use, but in other implementations, self-verification may not be available. Self-verification verifies the accuracy of the simulation results determined by the output block.

One technique of simulation verification involves determining whether the simulation results obtained satisfy (1) Kirchhoff's current law (KCL), (2) Kirchhoff's voltage law (KVL), and (3) the power conservation law. If the simulation results satisfy all three of these laws, the results are verified. However, if any one of the laws is not satisfied, then the simulation results have some inaccuracy and are not verified. U.S. patent application Ser. No. 11/279,391, filed Apr. 11, 2006, discusses simulation verification in greater detail.

Figure 6:
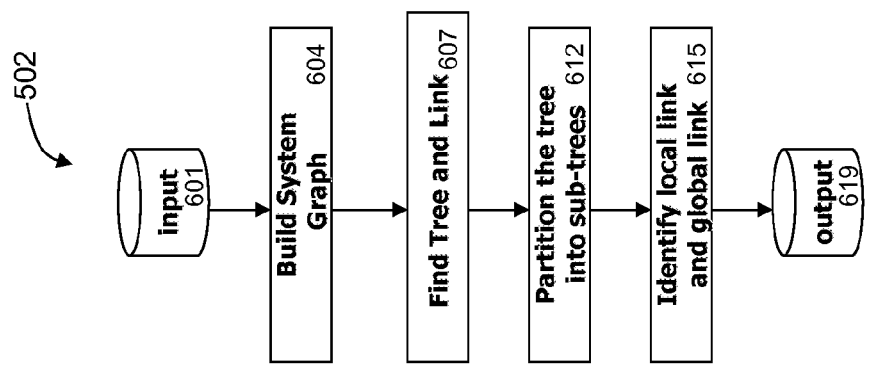
FIG. 6 shows a system or network tearing flow diagram.

FIG. 6 shows a system or network tearing flow 502. This flow is an embodiment of system tearing block 502 of FIG. 5. System or network tearing prepares a circuit for simulation. The simulation may be performed using a single computer or multiple computers, such as using distributed computing.

In an embodiment, the system provides an automatic computer-implemented technique of system tearing. System tearing breaks a circuit into smaller pieces so that the circuit may be simulated much more quickly. By "tearing" apart the circuitry according a technique of the invention, this permits each piece to be simulated, and then the pieces can be more easily reassembled to obtain an exact solution for the entire circuit. An important step to allow simulation by distributed computing is how a circuit is broken into smaller pieces, each of which may be simulated separately.

The system tearing flow includes input 601, building a system graph 604, finding a tree and link 607, partitioning the tree into subtrees 612, identifying local links and global links 615, and outputting the results 619.

Input 601 to the flow includes a netlist or equivalent description of the circuit and voltage and current sources. For example, the input may be provided by database 425 which includes the netlist or source information in a format readable by a system of the invention. Any database format may be used including hierarchical, relational, flat, comma delimited, and others. In addition to databases, others data structures may be used to provide input data to the system. Build system graph 604 takes the circuit and builds the circuit connectivity into a graph data structure. A circuit has nodes and branches. The branches may have devices, sources, or other components. Each junction pair in a circuit may have a current I and voltage or potential E associated with it.

Figure 7:
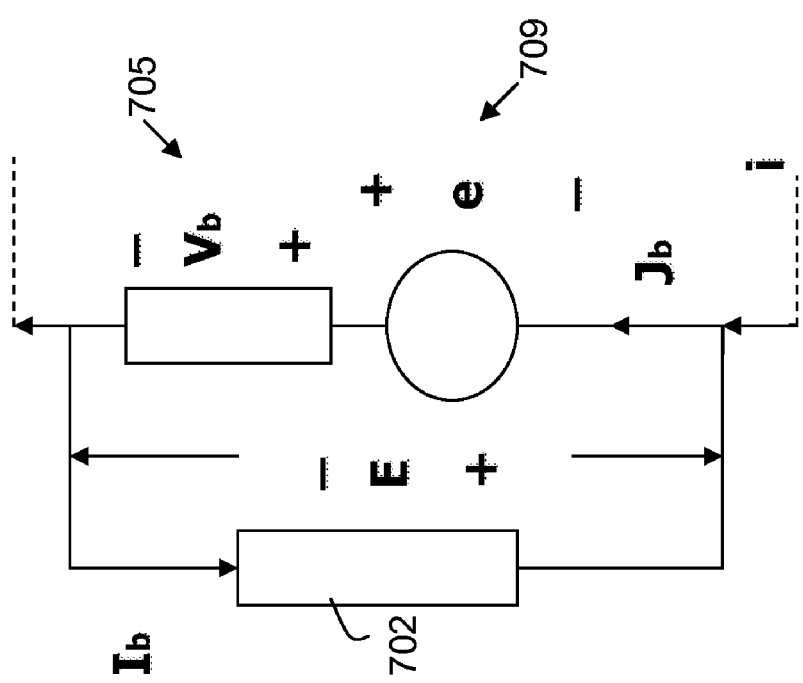
FIG. 7 shows a branch.

FIG. 7 shows an example of a branch of a circuit. This branch has a current source 702, impedance or admittance 705, and voltage source 709. In electrical engineering, the admittance (Y) is the inverse or reciprocal of impedance (Z). There are also currents $I_b$ and $J_b$.

A circuit component is represented using a branch such as shown in FIG. 7. More specifically, each tree branch represents resistance-capacitance-inductance (RCL) and one or more sources, such as current source, voltage source, dependent current source, and dependent voltage source. As discussed above, a device model for a transistor or other device is a RCL network with a dependent source. Therefore, each transistor of the circuit will be a branch in the network graph. The entire graph is a RCL network with sources.

Figure 8:
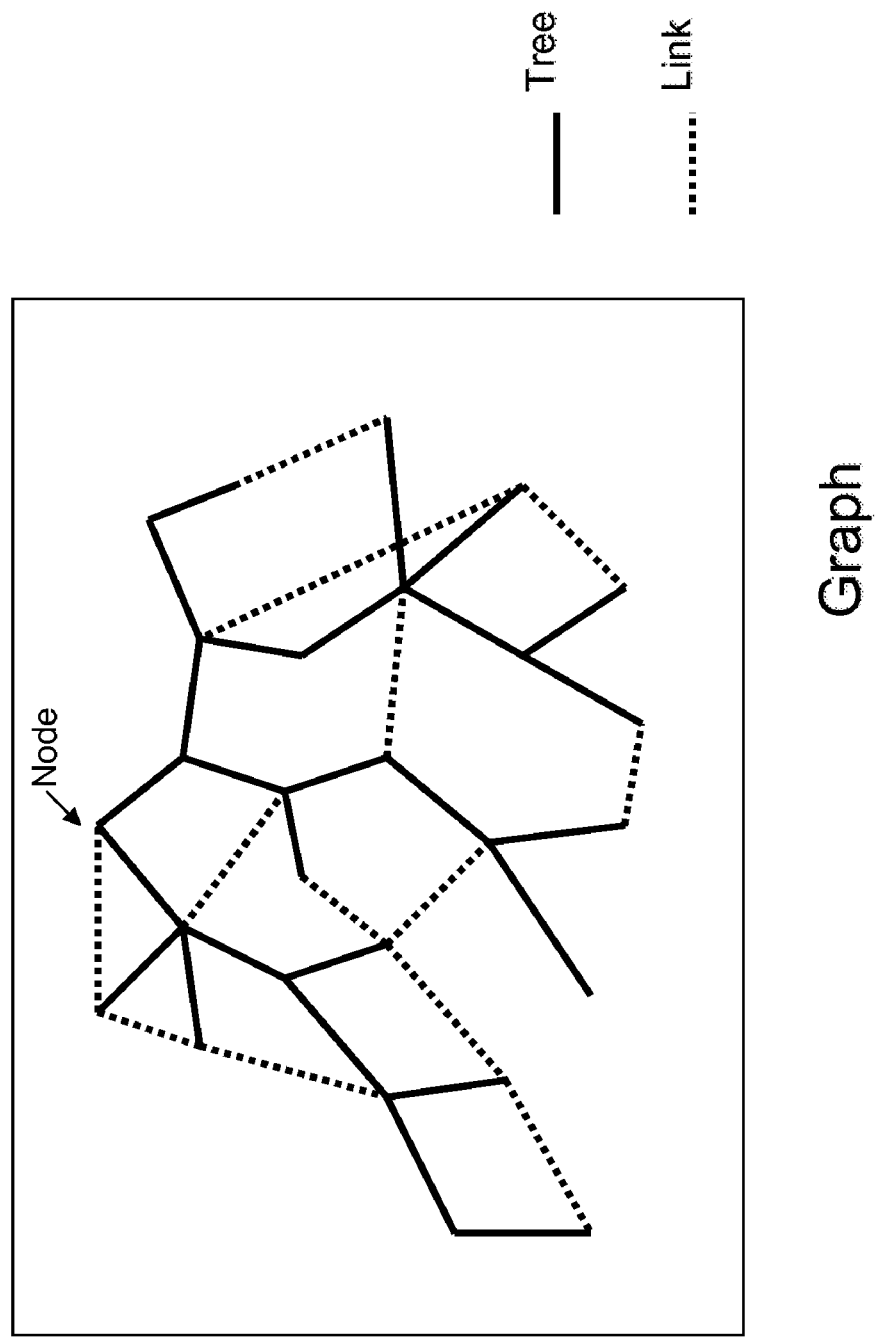
FIG. 8 shows a graph with a tree, nodes, branches, and links.

FIG. 8 shows a graph of a tree and links. Tree branches are shown using solid lines, and links are shown using dotted lines. At a junction (or intersection) of two or more tree branches is a node. In a graph, some information is associated with each node and edge. For example, a node of the graph may be a node in the circuit and edge may be a branch in the circuit. A graph is an abstract data type that consists of a set of nodes and a set of edges that establish relationships or connections between the nodes. A specific technique, among others, to implement a graph data structure is to use linked lists over the nodes and the ingoing and outgoing edges of the nodes. Another technique to implement a graph is to use an array structure. There are many other approaches to implementing a graph data structure in a computer system, and any of these may be used.

After a graph of the circuit is built, finding a tree and link 607 identifies branches and links of the tree. A tree of a graph is a connected subgraph that includes all the nodes of the graph but contains no loops. A loop is a circular path from a first node through other nodes and returns to the first node. A loop has a voltage drop of zero. A subgraph of a graph is a set of branches and nodes belonging to a graph. A link forms a loop with one or more tree branches, and may be referred to as a unit link. A tree branch does not form a loop. Typically, a circuit or system has one tree and multiple links. FIG. 8 shows an example of a graph with nodes, branches, and links. A circuit network is represented using such a graph data structure. There are many techniques to identify trees and links. One approach is a depth first search. Another technique is a breadth first search. Either of these may be used or a combination of these two may be used. For example, one technique of finding a tree involves starting at a starting node. This node can be any node in the graph. Depending on which node is selected as the starting node, the tree may be different from a tree found using a different starting node. Proceeding branch by branch through the graph, each branch of the graph will be designated as a tree or link to create a graph, such as in FIG. 8, having tree branches and links.

Partition the tree into subtrees 612 breaks up or tears a tree into smaller subtrees. In an embodiment of the invention, partitioning the tree breaks up the tree into a number of subtrees with the same or close to the same number of tree branches. Each subtree is a subcircuit of the complete circuit. This technique may be automated using, for example, a computer. In particular, a number count or predefined count may be selected, such as two, three, four, five, six, seven, eight, ten, more than ten, and so forth. Smaller counts are used to break the tree into more subtrees than for larger counts.

According to one technique, a first subtree is formed by repeatedly adding branches of the tree to the first subtree when a number of branches in the first subtree is less than a predefined count and there are branches in the tree which have not yet been assigned to a subtree. This technique is continued with the second subtree, third subtree, and so forth until all branches of the tree have been assigned to a subtree. Each branch of the tree is only assigned to one subtree. Each subtree is a tree with connected branches. Using this counting approach, each subtree will have a number of branches less than or equal to the predefined count. The predefined count may be set by the system, or may be user defined.

Figure 9:
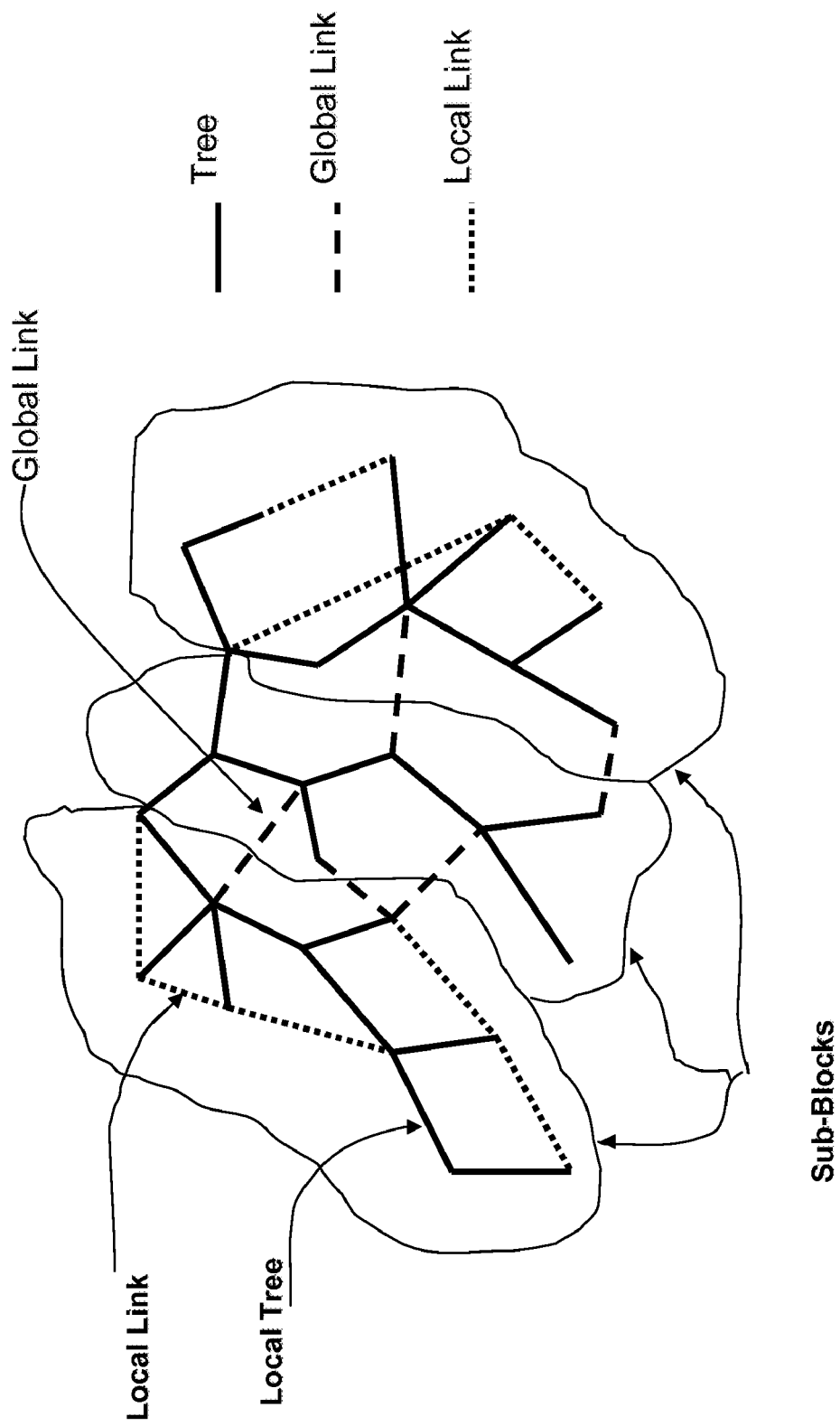
FIG. 9 shows local trees, global links, and local links of a graph.

For example, FIG. 9 shows the tree of FIG. 8 partitioned into three subtrees (also may be called local trees or subblocks), where the subtrees have 8 or 9 branches. As a further example, if the count is two, a tree is separated every two tree branches until it can no longer be subdivided. If there are an odd number of branches in the tree, then the last subtree will have one branch, rather than two.

Described above is merely an example of one technique of partitioning. Other techniques may be used to partition the tree into subtrees, and any of these other techniques may also be used in implementing the invention.

Identify local links and global links 615 determines which links are local are which are global. In FIG. 9, tree branches are shown using solid lines, global links are shown using broken lines, and local links are shown using dotted lines. A link that forms a loop in a subtree is a local link. A link that forms a loop in two or more subtrees (or multiple subtrees) is a global link. A global link forms a loop with branches of two or more subtrees.

FIG. 9 shows a tree having three subblocks. For ease in identifying subblocks in the figure, each subblock is circled with a boundary line. Each subblock has a local tree and local links. The local links for a particular subblock are located within the subblock and do not cross a subblock boundary line. There are global links between subblocks and local trees. The global links cross the subblock boundary lines.

Returning to FIG. 5, subblock solver 506 will solve each subblock including local links, but not global links. During this step, a circuit subblock is simulated while circuit branches between subblocks (i.e., global links) are ignored. The subblock solver will take individual subtrees or subblocks and solves each of these subtrees or subblocks independently.

Therefore, a solution to any particular subblock may be determined without considering other subblocks. So, it will be immaterial in what the order the subblocks are simulated. This helps a distributed computing embodiment of the invention because by allowing each subblock to be simulated independently, there will not be any scheduling problems.

The solver determines the IR drop or voltage drop for each branch or local link, or both. In other words, the solver determines the voltage and current for each branch for the given conditions. To determine the IR drops, the computer will perform a matrix inversion or LU factoring of a subblock in the tree network. The subblock which is solved includes branches and local links, but not global links.

With an embodiment of a system of the invention, a single computer may perform computations for each subblocks in sequence. Since the subblock is much smaller than the matrix of the entire tree, computation time is reduced. In further embodiments, multiple computers may perform computations for subblocks at the same time, reducing simulation time compared to using one computer or solving a very large matrix for the whole tree.

More specifically, the subblock solver can send each of the subtrees as a computing task or job to be solved by a different computer in a distributed computing network. If there are too few computers to do all jobs simultaneously, two or more tasks may be queued up on a computer for computer. In such fashion, different computers in the distributed computing network can perform parts of circuit simulation calculations in parallel, thus further speeding up the circuit simulation process.

Interblock solver 510 will solve the IR drop or voltage drop for the global links, which are the links or interconnection between the blocks. The interblock solver determines the junction voltage or junction current, or both, for each global link. The junction voltage is the voltage across the global link, and the junction current is the current which flows through the global link. The results of the interblock solver will be independent of the results of subblock solver. So, the interblock solver does not use the results from the subblock solver. Interblock solver may be performed using a single computer or distributed computing.

Update system partial results 514 combines the partial results with the interconnect-level results (obtained using the interblock solver) to find the exact or real results for the entire circuit. Update system partial results updates the system results with the contribution of the global links to each subtree. In an implementation, the results obtained after update system partial results will be the real solution for the whole system, as if the system were solved together as one large matrix. This real solution will not be an estimation, approximation, or an iteratively obtained solution, but an exact solution.

Output block 519 outputs the IR drop results into database 425. For each node, there may be a nodal voltage, branch voltage, and branch current. Branch voltage is the voltage across the two nodes of a branch. Given the nodal voltages, the branch voltage may be calculated. Branch current is the current flowing through a branch.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
providing a system graph of an electronic circuit comprising impedance components;
identifying each branch of the system graph as at least one of a tree branch or a link, wherein the tree branches form a tree of the system graph;
using a processor, partitioning the tree into at least a first subtree and a second subtree;
identifying links of the system graph as at least one of a global link or a local link, wherein a global link forms a path from a branch of the first subtree to a branch of the second subtree,
the first subtree is formed by repeatedly adding branches of the tree to the first subtree when a number of branches in the first subtree is less than a predefined count and there are branches in the tree which have not yet been assigned to a subtree, the second subtree is formed by repeatedly adding branches of the tree, not already assigned to the first subtree, to the second subtree when a number of branches in the second subtree is less than the predefined count and there are branches in the tree which have not yet been assigned to a subtree, and
a loop with the global link and branches of the first and second subtrees has a voltage drop of 0;
calculating a first current and voltage solution for each branch of the first subtree without global links; and
calculating a second current and voltage solution for each branch of the second subtree without global links.

2. The method of claim 1 wherein the first current and voltage solution is calculated using a first core of a multiple core processor and the second current and voltage solution is calculated using a second core of the multiple core processor.

3. The method of claim 1 wherein the first current and voltage solution is calculated using a first multicore processor and the second current and voltage solution is calculated using a second multicore processor, and the first and second multicore processors are coupled through a network interface.

4. The method of claim 1 wherein calculating a solution to the first subtree is performed in parallel with calculating a solution to the second subtree.

5. The method of claim 1 further comprising:
calculating an interblock solution comprising junction voltage and junction current for global links between the first subtree and the second subtree.

6. The method of claim 5 further comprising:
updating the solutions for the first subtree and the second subtree with a contribution from the interblock solution; and
outputting an exact solution comprising voltages and currents for each branch of the system graph of the electronic circuit.

7. The method of claim 1 comprising:
obtaining a solution comprising voltages for each branch of the system graph of the electronic circuit;
summing the voltages of the solution for each independent loop in the system graph; and
indicating a not verified condition when at least one of the loops in the graph has a nonzero sum.

8. The method of claim 1 comprising:
obtaining a solution comprising currents for each branch of the system graph of the electronic circuit;
summing the currents of the solution at each node in the system graph; and indicating a not verified condition when at least one of the nodes in the graph has a nonzero sum.

9. The method of claim 1 comprising:
obtaining a solution comprising voltages and currents for each branch of the system graph of the electronic circuit;
identifying independent loops in the system graph;
summing the voltages of the solution for each independent loop in the system graph;
summing the currents of the solution at each node in the system graph;
summing power consumed for each branch in the system graph of the solution to obtain a total power consumed;
determining a total input power to the circuit network using input sources associated with the circuit;
subtracting the total power consumed from the total input power to obtain a total power difference;
indicating a not verified condition when at least one of the loops in the graph has a nonzero sum;
indicating a not verified condition when at least one of the nodes in the graph has a nonzero sum; and
indicating a not verified condition when the total power difference is not zero.

10. A system comprising:
a circuit simulation block comprising:
a system tearing block to identify each branch of an impedance circuit network graph as at least one of a tree branch or a link, wherein the tree branches form a tree of the graph, and the tree comprises no loops,
divide the tree into at least a first subtree and a second subtree, wherein each the first and second subtrees comprises no loops, and
identify links of the impedance circuit network graph as at least one of a global link or a local link, wherein a global link forms a path from a branch of the first subtree to a branch of the second subtree, a global link forms a loop with branches of the first and second subtrees,
the first subtree is formed by repeatedly adding branches of the tree to the first subtree when a number of branches in the first subtree is less than a predefined count and there are branches in the tree which have not yet been assigned to a subtree, and the second subtree is formed by repeatedly adding branches of the tree, not already assigned to the first subtree, to the second subtree when a number of branches in the second subtree is less than the predefined count and there are branches in the tree which have not yet been assigned to a subtree, and
the loop with the global link and branches of the first and second subtrees has a voltage drop of 0; and
a subblock solver block to direct the first subtree to a first computing device of a plurality of computing devices for calculation and the second subtree to a second computing device of the plurality of computing devices for calculation.

11. The system of claim 10 wherein the subblock solver block directs the first subtree to the first processing unit without any global links and directs the second subtree to the second processing unit without any global links.

12. The system of claim 10 wherein the circuit simulation block further comprises:
an output block to provide based on results of the first subtree and the second subtree an exact solution for the circuit network graph.

13. The system of claim 10 wherein the first computing device comprises a first core of a multicore processor and the second computing device comprises a second core of the multicore processor.

14. The system of claim 10 wherein the plurality of computing devices are coupled via an Ethernet connection, and each of the computing devices comprises multiple cores.

15. The system of claim 10 comprising:
an output block to provide based on results comprising the first and second subtrees a solution for the circuit network graph; and
a solution verification block to verify the solution for the graph comprising:
sum voltages of the solution for each independent loop in the graph;
sum the currents of the solution at each node in the system graph;
sum power consumed for each branch in the system graph of the solution to obtain a total power consumed;
determine a total input power to the circuit network using input sources associated with the circuit;
subtract the total power consumed from the total input power to obtain a total power difference;
indicate a not verified condition when at least one of the loops in the graph has a nonzero SUM;
indicate a not verified condition when at least one of the nodes in the graph has a nonzero sum; and
indicate a not verified condition when the total power difference is not zero.

16. A computer program product embodied using a computer-readable medium, the computer program product executable by a computer processor, comprising:
a first executable code component to provide a system graph of an electronic circuit comprising impedance components;
a second executable code component to identify each branch of the system graph as at least one of a tree branch or a link, wherein the tree branches form a tree of the system graph;
a third executable code component to partition the tree into at least a first subtree and a second subtree;
a fourth executable code component to identify links of the system graph as at least one of a global link or a local link, wherein a global link forms a path from a branch of the first subtree to a branch of the second subtree,
the first subtree is formed by repeatedly adding branches of the tree to the first subtree when a number of branches in the first subtree is less than a predefined count and there are branches in the tree which have not yet been assigned to a subtree, and the second subtree is formed by repeatedly adding branches of the tree, not already assigned to the first subtree, to the second subtree when a number of branches in the second subtree is less than the predefined count and there are branches in the tree which have not yet been assigned to a subtree, and
a loop with the global link and branches of the first and second subtrees has a voltage drop of 0; and
a fifth executable code component to direct the first subtree to a first processing unit for calculation of current and voltage for each branch of the first subtree and to direct the second subtree to a second processing unit for calculation of current and voltage for each branch of the second subtree.

17. The system of claim 16 wherein the fifth executable code component directs the first subtree to the first processing unit without any global links and directs the second subtree to the second processing unit without any global links.

18. The method of claim 16 wherein the fifth code component direct the first subtree to the first processing unit by transferring data of the first subtree over a network.

19. The method of claim 16 wherein the first processing unit is a first core of a processor and the second processing unit is a second core of the processor.

20. The method of claim 16 wherein the first processing unit resides on a first computing device, the second processing unit resides on a second computing device, and the first computing device is different from the second computing device.

* * * * *